United States Patent
Axelrod (10) Patent No.: US 11,288,452 B2
(45) Date of Patent: *Mar. 29, 2022

(54) DUAL MONOLINGUAL CROSS-ENTROPY-DELTA FILTERING OF NOISY PARALLEL DATA AND USE THEREOF

(71) Applicant: Beijing DiDi Infinity Technology and Development Co., Ltd., Beijing (CN)

(72) Inventor: Amittai Axelrod, Marina del Rey, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 368 days.

This patent is subject to a terminal disclaimer.

(21) Appl. No.: 16/523,936

(22) Filed: Jul. 26, 2019

(65) Prior Publication Data

US 2021/0026919 A1    Jan. 28, 2021

(51) Int. Cl.
*G06F 40/263* (2020.01)
*G06N 20/00* (2019.01)

(52) U.S. Cl.
CPC ........... *G06F 40/263* (2020.01); *G06N 20/00* (2019.01)

(58) Field of Classification Search
None
See application file for complete search history.

(56) References Cited

U.S. PATENT DOCUMENTS

| | | |
|---|---|---|
| 10,318,640 B2 | 6/2019 | Hughes et al. |
| 11,037,028 B2 | 6/2021 | Bojar et al. |
| 2012/0203539 A1 | 8/2012 | Axelrod et al. |
| 2013/0103695 A1* | 4/2013 | Rarrick .................. G06F 40/51 707/748 |
| 2014/0303955 A1 | 10/2014 | Kim et al. |
| 2015/0169549 A1* | 6/2015 | Das ........................ G06F 40/58 704/2 |

FOREIGN PATENT DOCUMENTS

| | | |
|---|---|---|
| CN | 101201820 A | 6/2008 |
| CN | 106598959 A | 4/2017 |
| CN | 108874790 A | 11/2018 |
| CN | 109684648 A | 4/2019 |
| WO | 2019119852 A1 | 6/2019 |

OTHER PUBLICATIONS

Mikel Artetxe et al., "Margin-based Parallel Corpus Mining with Multilingual Sentence Embeddings", ACL (Association for Computational Linguistics), Aug. 7, 2019, 7 pages.

Amittai Axelrod, "Cynical Selection of Language Model Training Data", arXiv, Sep. 7, 2017, pp. 1-19.

(Continued)

*Primary Examiner* — Antim G Shah
(74) *Attorney, Agent, or Firm* — Sheppard Mullin Richter & Hampton LLP (57) ABSTRACT

Sentence pairs can be filtered using dual monolingual conditional cross-entropy filtering. The filtered sentence pairs can be used to train a model for performing a language processing task, such as machine translation.

19 Claims, 4 Drawing Sheets

(56) References Cited

OTHER PUBLICATIONS

Amittai Axelrod et al., "Domain Adaptation via Pseudo In-Domain Data Selection", EMNLP (Empirical Methods in Natural Language Processing), 2011, 8 pages.

Andoni Azpeitia et al., "STACC, OOV Density and N-gram Saturation: Vicomtech's Participation in the WMT 2018 Shared Task on Parallel Corpus Filtering", WMT Conference on Statistical Machine Translation, 2018, 7 pages.

Christian Buck et al., "Findings of the WMT 2016 Bilingual Document Alignment Shared Task", WMT Conference on Statistical Machine Translation, 2016, 10 pages.

Grant Erdmann et al., "Coverage and Cynicism: The AFRL Submission to the WMT 2018 Parallel Corpus Filtering Task", WMT Conference on Statistical Machine Translation, 2018, 5 pages.

Francisco Guzman et al., "Two New Evaluation Data-Sets for Low-Resource Machine Translation: Nepali-English and Sinhala-English", arXiv, Feb. 4, 2019, 13 pages.

Kenneth Heafield, "KenLM: Faster and Smaller Language Model Queries", Proceedings of the 6th Workshop on Statistical Machine Translation, Edinburgh, Scotland, UK, Jul. 30-31, 2011, pp. 187-197.

Marcin Junczys-Dowmunt, Dual Conditional Cross-Entropy Filtering of Noisy Parallel Corpora, WMT Conference on Statistical Machine Translation, 2018, 8 pages.

Philipp Koehn et al., "Findings of the WMT 2019 Shared Task on Parallel Corpus Filtering for Low-Resource Conditions", WMT Conference on Statistical Machine Translation, 2019, pp. 54-72.

Philipp Koehn et al., "Findings of the WMT 2018 Shared Task on Parallel Corpus Filtering", WMT Conference on Statistical Machine Translation, 2018, 14 pages.

Taku Kudo et al., "SentencePiece: A simple and language independent subword tokenizer and detokenizer for Neural Text Processing", EMNLP (Empirical Methods in Natural Language Processing), 2018, pp. 66-71.

Chi-kiu Lo et al., "Accurate semantic textual similarity for cleaning noisy parallel corpora using semantic machine translation evaluation metric: The NRC supervised submissions to the Parallel Corpus Filtering task", WMT Conference on Statistical Machine Translation, 2018, 9 pages.

Robert C. Moore et al., "Intelligent Selection of Language Model Training Data", ACL (Association for Computational Linguistics), 2010, 5 pages.

Kishore Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.

Lucia Santamaria et al., "Data Selection with Cluster-Based Language Difference Models and Cynical Selection", Proceedings of the 14th International Workshop on Spoken Language Translation, Tokyo, Japan, Dec. 14-15, 2017, pp. 137-145.

Abhinav Sethy et al., "Text data acquisition for domain-specific language models", EMNLP (Empirical Methods in Natural Language Processing), 2006, 8 pages.

Xuan Zhang et al., Cirriculum Learning for Domain Adaptation in Neural Machine Translation, NAACL (North American Association for Computational Linguistics), 2019, pp. 1903-1915.

PCT International Search Report and the Written Opinion dated Oct. 29, 2020, issued in related International Application No. PCT/CN2020/103328 (9 pages).

PCT International Search Report and the Written Opinion dated Oct. 23, 2020, issued in related International Application No. PCT/CN2020/103333 (9 pages).

Notice of Allowance dated Sep. 22, 2021, issued in related U.S. Appl. No. 16/523,906 (18 pages).

\* cited by examiner

DUAL MONOLINGUAL CROSS-ENTROPY-DELTA FILTERING OF NOISY PARALLEL DATA AND USE THEREOF

TECHNICAL FIELD

The disclosure relates generally to filtering sentence pairs in noisy parallel corpora.

BACKGROUND

A parallel corpus of bilingual data is needed to train machine translation models. Parallel corpora of bilingual data can be noisy, meaning that the two halves of the sentence pair are not exact translations of each other. There is a need to filter noisy parallel corpora of bilingual data.

SUMMARY

One aspect of the present disclosure is directed to a system for filtering sentence pairs in two languages. In some embodiments, the system comprises: one or more processors; and a memory storing instructions that, when executed by the one or more processors, cause the system to perform: receiving a subset of sentence pairs of a plurality of sentence pairs. A first half and a second half of each of the plurality of sentence pairs can be associated with an identical first label of an identical first language and an identical second label of an identical second language, respectively. Each of the subset of sentence pairs can be selected using a feature score for the sentence pair. The feature score can be determined using a first monolingual language model of the first language, a first monolingual language model of the second language, a first entropy (or likelihood or perplexity) of the first half with respect to the first monolingual language model of the first language, and a second entropy (or likelihood or perplexity) of the second half of the sentence pair with respect to the first monolingual language model of the second language. The instructions, when executed by the one or more processors, cause the system to perform: training a language processing model using the subset of sentence pairs.

In some embodiments, the memory stores instructions, that when executed by the one or more processors, can cause the system to perform: selecting the subset of sentence pairs using the feature score for each of the sentence pair.

Another aspect of the present disclosure is directed to a system for filtering sentence pairs in two languages. In some embodiments, the system comprises: one or more processors; and a memory storing instructions that, when executed by the one or more processors, cause the system to perform: receiving a language processing model trained using a subset of sentence pairs of a plurality of sentence pairs. A first half and a second half of each of the plurality of sentence pairs can be associated with an identical first label of an identical first language and an identical second label of an identical second language, respectively. Each of the subset of sentence pairs can be selected using a feature score for the sentence pair. The feature score can be determined using a first monolingual language model of the first language, a first monolingual language model of the second language, a first perplexity of the first half with respect to the first monolingual language model of the first language, and a second perplexity of the second half of the sentence pair with respect to the first monolingual language model of the second language. The instructions, when executed by the one or more processors, cause the system to perform: performing a machine translation task using the language processing model.

In some embodiments, the memory stores instructions, that when executed by the one or more processors, can cause the system to perform: selecting the subset of sentence pairs using the feature score for each of the sentence pair; and/or training the language processing model using the subset of sentence pairs.

Another aspect of the disclosure is directed to a method of filtering sentence pairs in two languages. In some embodiments, the method is under control of a processor and comprises: receiving a language processing model trained using a subset of sentence pairs of a plurality of sentence pairs. A first half and a second half of each of the plurality of sentence pairs can be associated with an identical first label of an identical first language and an identical second label of an identical second language, respectively. Each of the subset of sentence pairs can be selected using a feature score for the sentence pair determined using a first monolingual language model of the first language and a first monolingual language model of the second language. The method can comprise: performing a machine translation task using the language processing model.

In some embodiments, the feature score for each of the plurality of sentence pairs comprises a dual monolingual conditional cross-entropy score for the sentence pair determined using dual monolingual conditional cross-entropies with respect to the first half and the second half of the sentence pair, and the dual monolingual conditional cross-entropies with respect to the first half and the second half of the sentence pair are determined using the first monolingual language model of the first language and the first monolingual language model of the second language. In some embodiments, the dual conditional monolingual cross-entropy score for each of the plurality of sentence pairs comprises the dual monolingual conditional cross-entropies exponentiated.

In some embodiments, the feature score for each of the plurality of sentence pairs is determined using a first perplexity of the first half of the sentence pair with respect to the first monolingual language model of the first language and a second perplexity of the second half of the sentence pair with respect to the first monolingual language model of the second language. In some embodiments, the feature score for each of the plurality of sentence comprises: determining a feature score for each of the plurality of sentence pairs using a difference between a first likelihood of the first half of the sentence pair with respect to the first monolingual language model of the first language and a second likelihood of the second half of the sentence pair with respect the first monolingual language model of the second language.

In some embodiments, an amount of information comprised in the first monolingual language model in the first language and an amount of information comprised in the first monolingual language model in the second language are similar. In some embodiments, the first monolingual language model in the first language is trained using a plurality of first training sentences in the first language, wherein the first monolingual language model in the second language is trained using a plurality of second training sentences in the second language, and wherein a number of different words comprised in all first training sentences of the plurality of first training sentences in the first language and a number of different words comprised in all second training sentences of the plurality of second training sentences in the second language are similar. In some embodiments, the first monolingual language model in the first language is trained using a plurality of first training sentences in the first language, wherein the first monolingual language model in the second language is trained using a plurality of second training sentences in the second language, and wherein a perplexity of the first monolingual language model in the first language with respect to a plurality of first test sentences in the first language and a perplexity of the first monolingual language model in the second language with respect to a plurality of second test sentences in the second language and parallel to the plurality of first test sentences are similar.

In some embodiments, each of the subset of sentence pairs is selected using a plurality of feature scores comprising: a length score determined using a ratio of a first length of the first half of the sentence pair and a second length of the second half of the sentence pair; a language identification score determined using a first confidence score and a second confidence score that words comprised in the first half and the second half of the sentence pair, respectively, are in the first language and the second language, respectively; and/or a rank score comprising a product of a rank score comprising a product of (i) a first monolingual rank score for the first half of the sentence pair determined using a first ranking of the first half of the sentence pair when selecting the sentence pair to train first language models that model representative first sentences in the first language and (ii) a second monolingual rank score for the second half of the sentence pair determined using a second ranking of the second half of the sentence pair when selecting the sentence pair to train second language models, corresponding to the first language models, that model representative second sentences in the second language.

In some embodiments, each of the subset of sentence pairs is selected using an overall score for the sentence pair comprising a product of all feature scores of the plurality of feature scores for the sentence pair. In some embodiments, each of the subset of sentence pairs is selected using the feature score and a first predetermined threshold of a number of different words comprised in the first halves of all sentence pairs of the subset of sentence pairs. The first predetermined threshold can comprise a number of different words in the first language comprised in the first halves of all sentence pairs of the subset of sentence pairs. In some embodiments, each of the subset of sentence pairs is selected using the feature score and a first predetermined threshold of a number of different words comprised in the first halves of all sentence pairs of the subset of sentence pairs, and a second predetermined threshold of a number of different words comprised in the second halves of all sentence pairs of the subset of sentence pairs.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Noisy Parallel Data Filtering

Disclosed herein include embodiments of a monolingual approach of filtering for parallel data from a noisy corpus in a low-resource scenario. The method can be used to filter a noisy corpus when no parallel data is available. The method can be featherweight and can be implemented end-to-end on a computing device (e.g., a standard laptop, a personal desktop computer, etc.) in a few hours (e.g., three hours).

Dual Conditional Cross-Entropy Filtering

In some embodiments, a shared task on parallel corpus filtering can require selecting subcorpora of 10M and 100M words from an extremely noisy 1B word language 1-language 2 (L1-L2) parallel corpus from a crawler (e.g., Paracrawl). For example, the two languages can be German and English. These subcorpora can then be used to train machine translation (MT) systems, and evaluated on held-out test sets. In some embodiments, filtering of noisy parallel data can be based on dual conditional cross-entropy and can comprise:

1. A filter based on language identification (ID)

2. A dual conditional cross-entropy filter to determine whether the halves of a sentence pair were of roughly equal translation probability 3. A cross-entropy difference filter to prioritize in-domain sentence pairs Language ID Filter Feature The first feature can use the langid Python module to classify the language of each half of each sentence pair to a language. Any sentence pair where either half is classified as being in an incorrect language can be removed. Sentence pairs with correctly-classified halves can be kept.

Dual Conditional Cross-Entropy Feature

The dual conditional cross-entropy filtering method can reward sentence pairs with minimal symmetric translation disagreement. That can be the difference in average (e.g., per-word) conditional cross-entropy of the sentence pair halves as shown below.

$$|H_{L1 \to L2}(s_{L2}|s_{L1}) - H_{L2 \to L1}(s_{L1}|s_{L2})|$$

For a sentence pair $(s_{L2}, s_{L1})$, the per-word conditional cross-entropy $H_{L1 \to L2}(s_{L2}|s_{L1})$ of one half of the sentence pair can be determined by using a translation model L1→L2 (translating a language L1 to a language L2) and the corresponding $H_{L2 \to L1}(s_{L1}|s_{L2})$ of the other half of the sentence pair can be determined using a translation model in the opposite direction (translating a language L2 to a language L1). The two translation models (TMs) can be trained in inverse directions using the same parallel corpus, so the two translation models may be equally expressive.

However, the difference in translation scores does not take into account whether the scores are good or not. A perfectly translated sentence pair where the translation models agree perfectly may have the same score as a poorly translated sentence pair where the translation models also agree. This same weakness may be found in the cross-entropy difference features (described below) on which the conditional cross-entropy difference is based. To force the better sentence pair to have a lower feature score than the other one or more pairs, a term including the average per-word conditional cross-entropy of the two halves can be added. Worse sentences have higher entropy, so lower entropy indicate better sentences (e.g., a score of zero can be ideal). The equation for the dual conditional cross-entropy can be as shown in Equation (1.1) below.

$$h(s_{L2}, s_{L1}) = |H_{L1 \to L2}(s_{L2}|s_{L1}) - H_{L2 \to L1}(s_{L1}|s_{L2})| + \frac{1}{2}(H_{L1 \to L2}(s_{L2}|s_{L1}) + H_{L2 \to L1}(s_{L1}|s_{L2})) \quad (1.1)$$

The first term in Equation (1.1) is the translation disagreement, and the second term is the average entropy. The score is exponentiated so that good sentence pairs have a feature score of 1, and bad sentence pairs have a score of zero, as shown in Equation (1.2) below.

$$f(s_{L2}, s_{L2}) = e^{-h(s_{L2}, s_{L1})} \quad (1.2)$$

The cross-entropy difference method can be used for language modeling. The cross-entropy difference method can be repurposed for machine translation.

Cross-Entropy Difference Feature

A third feature is a monolingual (e.g., English, German, or any other language) cross-entropy difference score shown in Equation (2).

$$H_{in}(s_{L2}) - H_{out}(s_{L2}) \quad (2)$$

The cross-entropies H can be determined using language models trained on some sentences (e.g., 1M sentences of news data) as in-domain data and some sentences (e.g., 1M random sentences obtained by Paracrawl) as out-of-domain data. In some embodiments, Equation (2) can be a good setup (e.g., an ideal setup) for cross-entropy difference, as Equation (2) fundamentally assumes that the two corpora are as different as possible.

Cynical Data Selection

The replacement of the cross-entropy difference filter can be based on cynical data selection, described below. The cross-entropy difference approach described above fundamentally views the training data as being either in-domain or out/general-domain. In some embodiments, this stark distinction may not be realistic. Cynical data selection relaxes that assumption (e.g., the two corpora may be as different as possible) and starts with one corpus of representative data (REPR), and one corpus of available data (AVAIL). The representative data can be representative of what a machine translation model be used for translating. The available data can be the data pool from which a subcorpus of data can be selected. No relationship needs to be assumed between the representative and available corpora, nor between the domains they cover.

The cynical data selection method can incrementally grow a corpus of sentences, selecting from AVAIL, in order to better model REPR. First, the perplexity (or entropy) of a language model (LM) trained on the already-selected data and evaluated on the REPR corpus can be estimated. Next, for each sentence still available in the data pool, the change in the perplexity (or entropy), denoted by ΔH, that would result from adding the sentence as a new sentence to the LM training data and re-training the LM using the LM training data with the new sentence can be estimated. The sentence with the lowest cross-entropy delta can be removed from AVAIL, and added to the selected pile. The process can then repeat. The computational cost for identifying the next single sentence to add can be $O(n^2)$. Identifying each next single sentence to add may not be computationally practical. Finding the best word v in the vocabulary $V_{REPR}$ to add once to the selected data can be efficient. For example, as described below, the best word v may be the one that most lower the entropy of a language model. From there, picking the best sentence still in AVAIL that contains that word v can be practical. The $n+1^{th}$ iteration, after selecting n sentences, is:

1. Find the single word $v \in V_{REPR}$ that would most lower the entropy (evaluated on REPR) of a language model. The language model can be trained using the n already-selected sentences and the one-word sentence "v".

2. Find a single sentence $s \in$ AVAIL containing v that would (also) most lower the entropy (evaluated on REPR) of a language model trained using the n already-selected sentences and the sentence s.

3. Remove s from AVAIL, update the language model with the count c of all words in s, and add s to the n already-selected sentences.

The cross-entropy delta ΔH can refer to a change in the entropy of a language model, evaluated on a constant test set, and caused by adding a new entry (e.g., a new line, a new sentence, a new word, etc.) to the language model's training corpus. There may be an entropic length penalty for increasing the size of the training corpus, and an entropy gain for adding new information to the training corpus. A "relative entropy" can be formulated as shown in Equation (3) below.

$$\Delta H_{n \to n+1} = \Delta H_{n+1} - \Delta H_n \quad (3)$$

$$\Delta H_{n \to n+1} = \underbrace{\log \frac{W_n + w_{n+1}}{W_n}}_{\text{Penalty}} + \underbrace{\sum_{v \in V_{REPR}} \frac{C_{REPR}(v)}{W_{REPR}} \log \frac{C_n(v)}{C_n(v) + c_{n+1}(v)}}_{\text{Gain}}$$

The penalty term depends on the length $w_{n+1}$ of the $n+1^{th}$ sentence, and the size in words $W_n$ of the already-selected data. The gain term depends on the empirical probability of each word v in the REPR corpus, and then the count $C_n$ of the word so far in the n selected sentences, and the count $c_{n+1}$ of the word in the $n+1^{th}$ sentence.

Sinhala-English Data

A shared task can focus exclusively on filtering a noisy parallel corpus for low-resource language pairs with considerably less data. Table 1 shows that 645 k lines (which can be sentences) of parallel Sinhala-English (Si-En) were provided in total—less than the small 1M German-English sentence pair subsets, filtered with the dual conditional cross-entropy filtering method, used to train the dual neural machine translation (NMT) engines for a scoring function.

TABLE 1

Parallel Data for Sinhala-English

| Corpus | Lines | Token (Si) | Token(En) |
| --- | --- | --- | --- |
| Open Subtitles | 601,164 | 3.4M | 3.6M |
| Ubuntu | 45,617 | 175k | 151k |
| Total | 646,781 | 3.5M | 3.7M |

The Si-En parallel data was drawn from conversations and technical manuals, unlike the Wiki-based evaluation data. Larger and more relevant, yet monolingual, corpora were provided from both Wikipedia and Common Crawl, detailed in Table 2.

TABLE 2

Corpus statistics for provided monolingual data in Sinhala and English, and an English subset of comparable size to the Sinhala data.

| Corpus | Lines | Tokens |
| --- | --- | --- |
| Sinhala Wikipedia | 156k | 4.7M |
| English Wikipedia | 67.8M | 1.9B |
| Sinhala Common Crawl | 5.2M | 110M |
| English Common Crawl | 380M | 8.9B |
| English Subset Wikipedia | 150k | 5.5M |
| English Subset Common Crawl | 6M | 123M |

The provided monolingual English data was several orders of magnitude larger than the Sinhala data, which would have made it difficult to create data, which would have made it difficult to create equally strong (or weak) monolingual models used in this work. A monolingual English corpus comparable in size and content to the Sinhala one was assembled by randomly selecting 150 k lines from Wikipedia and 6M lines from Common Crawl. Sentence-Piece, with model_type=word, was used to preprocess the Sinhala and English sides separately, producing a fairly word-like vocabulary of 100 k subwords for each language. Each SentencePiece model was trained on 1M lines of monolingual data: 150 k Wiki+850 k Common Crawl.

Dual Monolingual Conditional Cross-Entropy Filtering

In some embodiments, a shared task on parallel corpus filtering can be set for low-resource conditions, with the goal of translating texts in two languages (e.g., translating Wikipedia texts from Sinhala to English, from Nepali to English, etc.).

In some embodiments, filtering noisy parallel data can be based on a language ID filter feature, cross-entropy difference feature, and a length-based feature. In some embodiments, filtering noisy parallel data can be based on a cynical data selection ranking/score feature. The resulting entirely monolingual pipeline to filter noisy parallel data can be competitive with the other multilingual systems and methods when used to train downstream SMT systems.

For each sentence pair $(s_{L1}, s_{L2})$ (e.g., L1 is Sinhala, and L2 is English) in the noisy corpus, a final score was computed $$f(s_{L1}, s_{L2}) \in [0,1]$$

by multiplying each of the individual feature scores for the sentence pair, as shown in Equation (4).

$$f(s_{L1}, s_{L2}) = \Pi_i f_i(s_{L1}, s_{L2}) \quad (4)$$

The feature scores, and therefore the final score, all had the same range of [0, 1]. For evaluation, the lines were sorted from highest to lowest overall score, and then selected in that order until the number of selected English words reached the evaluation threshold. Any feature score being zero effectively removes that sentence pair from consideration. The selected subsets may then be submitted for evaluation by the task organizers. The following are the monolingual features used to score the noisy parallel data.

Length Ratio Feature

A length ratio feature based on the length ratio of the two halves of the sentence pair was used. The length ratio feature penalizes sentence pairs with sides of disparate lengths. A line can be deleted if the length ratio if off by more than a certain percentage (e.g., 10%, 20%, 30%, 40%, or 50%) from a desired length ratio (e.g., 0.5, 0.8, 1, 1.2, or 1.5) For example, a line was deleted if the length ratio was off by more than 20% from a desired length ratio of 1. A line was deleted if the length ratio was less than 0.8 or greater than 1.2. Any sentence pair where at least 15% of either half was numerals received a score of 0.

Language ID Feature

A considerable quantity of the provided Paracrawl data was not in the correct language. The halves of the sentence pair were classified using the langid Python module and assigned zero to any sentence pair with an incorrectly-labeled half. If the correct languages were selected, then the feature value was the product of the langid confidence scores. Inspecting the filter output showed that the product of the langid confidence scores was not strong enough. The langid classification had many false positives, as well as source-side (Sinhala) sentences that were mixed with a significant amount of English. The shared task's hard limit on the number of selectable words made minimizing the amount of English on the Sinhala side important. The languages have non-overlapping writing scripts, so erroneous characters can be detected. The langid score can be multiplied by the proportion of characters (excluding numerals and punctuation) in each sentence that belong to the correct Unicode block, resulting in an overall language ID feature that slightly extends the original.

Dual Monolingual Conditional Cross-Entropy Feature

For the dual conditional cross-entropy filtering method, MT systems were trained on clean parallel data for the task, but used the translation probability of each to score the Paracrawl data and not the translation output itself. The motivation for training the dual NMT systems on the same parallel corpus was to ensure that the models may have similar BLEU scores and translation probabilities for the halves of a truly parallel sentence pair.

Enough good parallel data for Sinhala and English was not available, which ruled out training models on identical information. However, perhaps the translation models themselves were not inherently necessary as long as similar scores could be obtained. Language models require less training data than an MT engine to be reliable, and can also output an average per-word probability for a sentence, and good monolingual data was provided. Language models with similar amounts of information were constructed in the hope that the language models might have similar perplexities for the halves of a parallel sentence pair, and different perplexities for a non-parallel pair. The result was a relaxation of the dual conditional translation cross-entropy feature that required monolingual data, and used equal likelihood instead of equal translation probability.

Dual Monolingual Conditional Cross-Entropy Feature—Setting Up Language Models

N-gram language models in different languages may not be comparable. Differences in morphology can lead to significant differences in word counts, data sparsity, and thus how well a fixed model architecture can represent the language. Instead of multilingual word embeddings using sparse data, SentencePiece (SP) was used to force the Sinhala and English corpora to have the same size vocabulary (100 k subwords). First, a standard lexicon size may mitigate the effect of morphology differences affecting sentence length and word sparsity. Secondly, a standard lexicon size may encourage language models trained on similar—but not parallel—English and Sinhala texts to have similar perplexities over each half of a parallel test set.

This may mean the two LMs had similar estimates of how much information is in each half of the parallel data. The two halves of the parallel corpus presumably contain the same amount of actual information, but two LMs may come up with the same estimate if they themselves contained comparable amounts of information, even if they did not the same information.

To test this, 4-gram language models were trained using KenLM on the Sinhala monolingual data and the restricted-size English data in Table 2, both unprocessed and after tokenizing with SentencePiece. The models were evaluated on the provided parallel valid and test sets. Table 3 shows that, indeed, forcing English and Sinhala LMs to have identical vocabulary sizes was enough to obtain nearly identical perplexities on the halves of a parallel corpus, even though the language models were trained on similar but not parallel data.

TABLE 3

Using SentencePiece to equalize LM perplexities in different languages on the dev sets.

| Corpus | valid | test |
|---|---|---|
| Sinhala, untokenized | 1,759.8 | 1,565.9 |
| English, untokenized | 1,069.2 | 985.3 |
| Sinhala, token = SP | 320.5 | 299.2 |
| English, token = SP | 302.5 | 292.7 |

Dual Monolingual Conditional Cross-Entropy Feature—Parallel Scoring with Monolingual LMs A first language model can be trained using monolingual Wikipedia data, which is the REPR corpus and is representative of the kind of data the language model will evaluate on. The perplexity on REPR corpus can be computed using the first language model in a first language.

A LM perplexity score quantifies the likelihood of a sentence according to the model. In some embodiments, the probability difference can be explicitly minimized. Sentences with identical probability can be preferred. Minimizing the probability difference may be more broadly applicable as the dataset representative of the kind of data to be extracted may not be needed.

Monolingual Sinhala and English LMs were constructed with similar perplexities on a parallel test set that resembled the task evaluation, so sentences with equal perplexities according to these two models may be parallel. Or, at least, that sentences with disparate perplexity scores may be deemed not-parallel, and filtered out.

The translation system conditional cross-entropies in Equation (1.1) can be replaced with the cross-entropies (or likelihoods or perplexities) from the two comparable language models disclosed herein (See Equation (5) for an example). Cross-entropies of two halves of a sentence pair determined using the two comparable language models may characterize the fluency of the two halves, regardless of the content of the two halves. Being equally likely is a positive indicator. Prioritizing likely sentences may be more important than prioritizing informative ones. Equation (1.1) can be modified to use dual monolingual conditional cross-entropies, for each sentence pair $(s_{L1}, s_{L2})$, instead of dual bilingual conditional cross-entropies. Dual monolingual conditional cross-entropies can be determined using, for example, Equation (5):

$$|H(s_{L1}|LM_{L1}) - H(s_{L2}|LM_{L2})| + \tfrac{1}{2}|H(s_{L1}|LM_{L1}) + H(s_{L2}|LM_{L1})| \quad (5)$$

where $H(s_{L1}|LM_{L1})$ denotes the entropy (or likelihood) of the first half $s_{L1}$ of the sentence pair according to a language model of the first language, and $H(s_{L2}|LM_{L2})$ denotes the entropy (or likelihood) of the second half $S_{L2}$ of the sentence pair according to a language model of the second language. The dual monolingual conditional cross-entropy determined using Equation (5) can be exponentiated to be in the range of [0, 1]. Compared to the translation system conditional cross-entropies described with reference to Equation (1.1), the dual monolingual cross-entropy filtering described with reference to Equation (5) involves one fewer set of approximations. Advantageously, the dual monolingual conditional cross-entropy filtering can be simpler and less computing resource intensive.

Cynical Data Selection Ranking/Score Feature

The monolingual cross-entropy difference feature score can be used to bias the filtering towards in-domain news data. In some embodiments, the cross-entropy difference feature has no sense of sufficiency: while seeing an identical sentence pair 10,000 times may not be helpful, the cross-entropy difference criterion assigns the same score to all copies. Cynical data selection selects sentences only if they contribute new information to the set of sentences already selected, and has previously been shown to help domain adaptation in SMT and NMT, and a variation can be used for corpus filtering task. As a side effect, cynical selection eliminates the need for explicit vocabulary coverage features that can be used for a shared task.

For each language, cynical data selection was used to rank the sentences in the noisy corpus. The Paracrawl data was set to be the Available set, and the clean monolingual Wikipedia data was set to be the Representative set. The subset of Paracrawl that best models monolingual Wikipedia was thus selected. The re-ranked Paracrawl corpus was then scored by converting the cynical data selection ranking to a percentage and subtracted from 1. Thus the sentence selected as number 15,000 out of 3M would have a score of 1-15 k/3M, and 1 would be the best score and zero the worse. The ranking score for a sentence pair was the product of the monolingual rank scores for the halves.

Results and Discussion

Dual monolingual conditional cross-entropy filtering can be purely monolingual. Parallel data can be used to sanity-check the language models trained in the Dual Monolingual Conditional Cross-Entropy—Setting Up Language Models section. Furthermore, all of the preprocessing, language modeling, data selection, and feature computation can be run on a laptop.

Some embodiments of the dual monolingual conditional cross-entropy filtering can be based on cynical data selection and used for filtering noisy parallel data. A filtering method based on dual monolingual conditional cross-entropy filtering can be considered a relaxation of dual conditional cross-entropy filtering and may not require any parallel data. Filtering based on dual monolingual conditional cross-entropy can use likelihood to judge the relationship between the halves of a sentence pair. In some embodiments, dual monolingual conditional cross-entropy filtering can be competitive in terms of performance. In some embodiments, dual monolingual conditional cross-entropy can be suitable for scenarios with little or no parallel data. Dual monolingual conditional cross-entropy filtering can be relatively undemanding of computational resources, as can be run end-to-end on a single laptop in a couple hours. Dual monolingual conditional cross-entropy filtering can integrate well into a feature ensemble for real-world deployment.

Environment of A Noisy Parallel Corpus Filtering System

Figure 1:
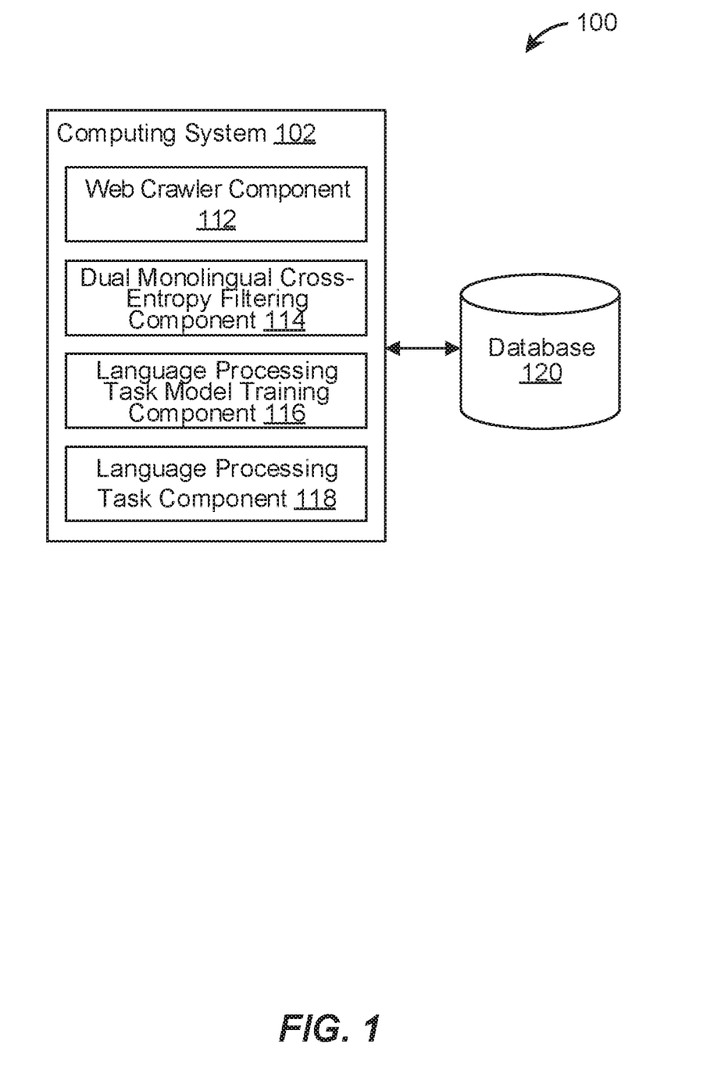
FIG. 1 illustrates an example environment of a noisy parallel corpus filtering system, in accordance with various embodiments of the disclosure.

FIG. 1 illustrates an example environment 100 for a noisy parallel corpus filtering system, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a web crawler component 112, a dual monolingual conditional cross-entropy filtering component 114, a language processing task model training component 116, and a language processing task component 118. The computing system 102 may include other components. While the computing system 102 is shown in FIG. 1 as a single entity, this is merely for ease of reference and is not meant to be limiting. One or more components or one or more functionalities of the computing system 102 described herein may be implemented in software. One or more components or one or more functionalities of the computing system 102 described herein may be implemented in hardware. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds.

The web crawler component 112 can crawl the Internet to generate noisy parallel corpus of sentence pairs in two languages (e.g., L1 and L2). The web crawler component 112 can implement Paracrawl in some embodiments. The dual monolingual conditional cross-entropy filtering component 114 can filter noisy parallel corpus generated by the web crawler component 112 to generate filtered parallel corpus that is less noisy or is clean for training a model for a language processing task. The language processing task model training component 116 can use the filtered parallel corpus generated by the dual monolingual conditional cross-entropy filtering component 114 to train a model (e.g., a language processing model, such as a machine translation model) for performing a language processing task (e.g., a translation task from one language to another). The language processing task component 118 can perform a language processing task using the model trained by the language processing task model training component 116. The noisy parallel corpus of sentence pairs or the filtered corpus of sentence pairs can be stored in a database 120. The language processing task model trained can be stored in the database 120.

Noisy Parallel Data Filtering Method

Disclosed herein are embodiments of a noisy parallel data filtering method. In some embodiments, the method comprises receiving a language processing model trained using a subset of sentence pairs of a plurality of sentence pairs. A first half and a second half of each of the plurality of sentence pairs can be associated with an identical first label of an identical first language and an identical second label of an identical second language, respectively. Each of the subset of sentence pairs can be selected using a feature score for the sentence pair determined using a first monolingual language model of the first language and a first monolingual language model of the second language. The method can comprise: performing a language processing task using the language processing model.

Figure 2:
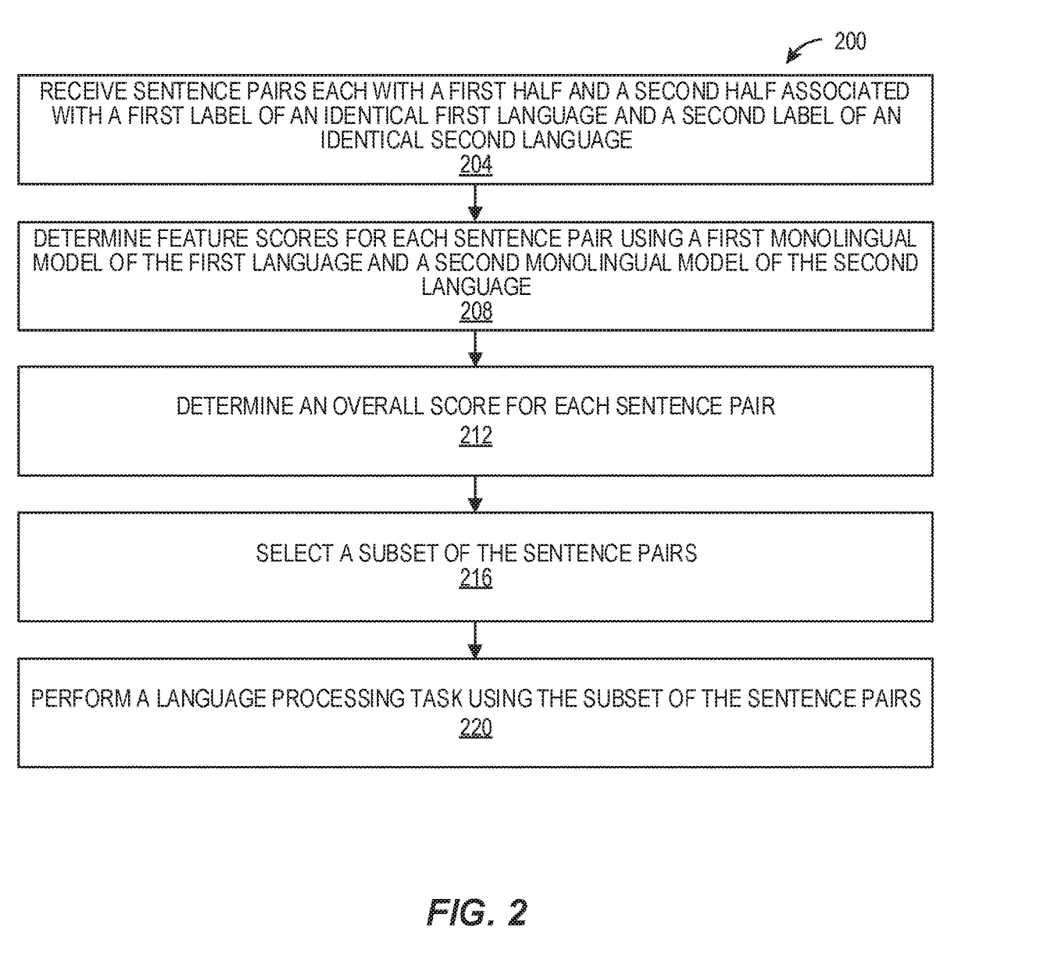
FIG. 2 is a flowchart of an example method for noisy parallel corpus filtering, in accordance with various embodiments of the disclosure.

FIG. 2 illustrates a flowchart of an example method 200, according to various embodiments of the present disclosure. The method 200 may be implemented in various environments including, for example, the environment 100 of FIG. 1 and by computer systems, such as the computer system 102 of FIG. 1, or the computer system 400 of FIG. 4. The operations of the method 200 presented below are intended to be illustrative. Depending on the implementation, the method 200 may include additional, fewer, or alternative steps performed in various orders or in parallel. The method 200 may be implemented in various computing systems or devices including one or more processors.

With respect to the method 200, at block 204, a computer system (such as the computer system 102 of FIG. 1, or the computer system 400 of FIG. 4) can receive a plurality or a corpus of sentence pairs. A first half and a second half of each of the plurality of sentence pairs can be associated with an identical first label of an identical first language and an identical second label of an identical second language, respectively. The corpus of sentence pairs can be noisy.

With respect to the method 200, at block 208, the computer system can determine a plurality of feature scores for each of the plurality of sentence pairs using a first monolingual language model of the first language and a first monolingual language model of the second language. The computer system can determine a dual monolingual conditional cross-entropy score (also referred to as a dual monolingual conditional cross-entropy) for each of the plurality of sentence pairs using dual monolingual conditional cross-entropy with respect to the first half and the second half of the sentence pair determined using the first monolingual language model of the first language and the first monolingual language model of the second language. The computer system can determine a dual monolingual conditional cross-entropy score for each of the plurality of sentence pairs using dual monolingual conditional cross-entropy as described with reference to Equation (5). The dual monolingual conditional cross-entropy score for each of the plurality of sentence pairs can comprise the dual monolingual conditional cross-entropy exponentiated. For example, the dual conditional monolingual cross-entropy score for each of the plurality of sentence pairs can comprise the dual monolingual conditional cross-entropy exponentiated as described with reference to Equation (1.2) The computer system can determine the dual monolingual conditional cross-entropy scores with respect to the first half and the second half of each of the plurality of sentence pairs using the first monolingual language model of the first language and the first monolingual language model of the second language, respectively.

The first monolingual language model in the first language can be trained using a plurality of first training sentences in the first language. The first monolingual language model in the second language can be trained using a plurality of second training sentences in the second language.

The computer system can determine a feature score for each of the plurality of sentence pairs using a first perplexity of the first half of the sentence pair with respect to the first monolingual language model of the first language and a second perplexity of the second half of the sentence pair with respect the first monolingual language model of the second language.

The dual monolingual conditional cross-entropy of each of the plurality of sentence pairs can be related to a first likelihood of the first half of the sentence pair with respect to the first monolingual language model in the first language and a second likelihood of the second half of the sentence pair with respect to the first monolingual model in the second language. The dual monolingual conditional cross-entropy scores can comprise a sum of the difference, and the average, of: the first difference in entropies between the first monolingual language model in the first language and the first monolingual language model in the second language.

The computer system can train the first monolingual language model in the first language using a plurality of first training sentences in the first language. The computer system can train the first monolingual language model in the second language using a plurality of second training sentences in the second language. An amount of information comprised in the first monolingual language model in the first language and an amount of information comprised in the first monolingual language model in the second language can be similar (e.g., identical or within a predetermined threshold difference). A number of different words comprised in all first training sentences of the plurality of first training sentences in the first language and a number of different words comprised in all second training sentences of the plurality of second training sentences in the second language can be similar (e.g., identical or within a predetermined threshold difference). A perplexity of the first monolingual language model in the first language with respect to a plurality of first test sentences in the first language and a perplexity of the first monolingual language model in the second language with respect to a plurality of second test sentences in the second language and parallel to the plurality of first test sentences can be similar (e.g., identical or within a predetermined threshold difference).

The computer system can determine a length ratio score for each sentence pair. For example, the computer system can determine a length score using a ratio of a first length of the first half of the sentence pair and a second length of the second half of the sentence pair.

The computer system can determine a language identification (ID) score for each sentence pair. For example, the computer system can determine a language identification score using a first confidence score and a second confidence score that words comprised in the first half and the second half of the sentence pair, respectively, are in the first language and the second language, respectively.

The computer system can determine a cynical data selection ranking/score for each sentence, for example, using cynical data selection (with the modification of not updating anything and the scoring done in a single pass or iteration). For example, the computer system can determine a rank score comprising a product of a first monolingual rank score and a second monolingual rank score for the first half and the second half, respectively, of the sentence pair determined using a first ranking of the first half of the sentence pair and a second ranking of the second half of the sentence pair, respectively, when selecting the first half and the second half of the sentence pair to train first language models and second language models, respectively, that model representative first sentences in the first language and second sentences in the second language, respectively.

With respect to the method 200, at block 212, the computer system can determine an overall score for each of the plurality of sentence pairs using the plurality of feature scores for the sentence pair. For example, the computer system can determine an overall score for each of the plurality of sentence pairs as described with reference to Equation (4).

With respect to the method 200, at block 216, the computer system can select a subset or a subcorpus of sentence pairs of the plurality of sentence pairs using the overall score of each of the plurality of sentence pairs. The computer system can select the subset of sentence pairs of the plurality of sentence pairs using the overall score of each of the plurality of sentence pairs and a first predetermined threshold of a number of words comprised in the first halves of all sentence pairs of the subset of sentence pairs. In some embodiments, one half of a sentence pair can be a sentence. In some embodiments, each half of a sentence pair can be a sentence. In some embodiments, one half of a sentence pair may not be a sentence. Each half of a sentence pair may not be a sentence. The first predetermined threshold can comprise a number of different words in the first language comprised in the first halves of all sentence pairs of the subset of sentence pairs. The computer system can select the subset of sentence pairs of the plurality of sentence pairs using the overall score of each of the plurality of sentence pairs, the first predetermined threshold of the number of different words comprised in the first halves of all sentence pairs of the subset of sentence pairs, and a second predetermined threshold of a number of different words comprised in the second halves of all sentence pairs of the subset of sentence pairs.

With respect to the method 200, at block 216, the computer system can perform a language processing task using the subset of sentence pairs selected. The computer system can train a language processing model (e.g., a machine translation model) using the subset of sentence pairs. The computer system can perform the language processing task using the language processing model. The language processing task can be speech recognition, machine translation, part-of-speech tagging, parsing, optical character recognition, handwriting recognition, information retrieval, or multilingual information retrieval.

Passenger, Driver, and Ridesharing Platform System Interactions

Figure 3:
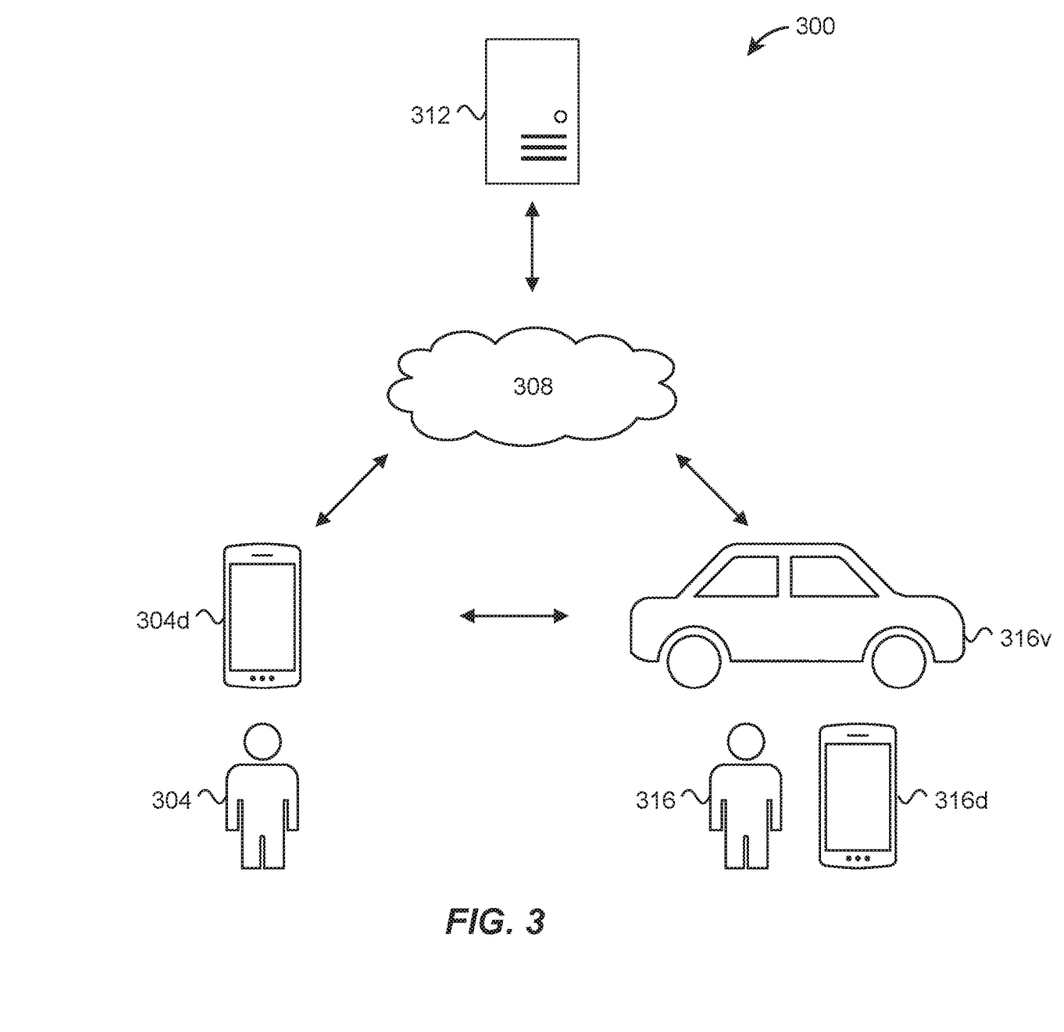
FIG. 3 illustrates an example environment for a ridesharing platform system, in accordance with various embodiments of the disclosure.

FIG. 3 illustrates an example environment for a ridesharing platform system. In the environment 300 illustrates in FIG. 3, a passenger 304 uses a passenger device 304$d$ (e.g., a smartphone, a tablet, or a computer) to make a trip request, via a communication network 308 (e.g., the Internet) to a ridesharing platform system 312 (such as the computing system 100 described with reference to FIG. 1). The ridesharing platform system 312 can in turn assign a driver 316 and the driver's vehicle 316 (e.g., a car, a SUV, and a truck) to fulfill the trip request. The driver 316 can receive and accept or decline the trip request using a driver device 316*d* (e.g., a smartphone, a tablet, or a computer). The driver device 316*d* can be a standalone device or part of the driver's vehicle 316.

During an onboarding process, the passenger 304 and the driver 316 can provide personal information to the ridesharing platform system 312. Stringent background checks can increase driver safety and passenger safety. The passenger 304 can provide the ridesharing platform system 312 with a pickup or starting location and a drop off or destination location of a trip and receive pricing information (e.g., the estimated cost of the trip) and timing information (e.g. the estimated duration of the trip). If the pricing information and timing information are acceptable to the passenger 304, the passenger 304 can make a trip request or place an order (e.g., by clicking an order button) to the ridesharing platform system 312. After receiving the trip request from the passenger 304, the ridesharing platform system 312 can decide whether to accept the trip request and assign or match the driver 316 to the passenger for the particular trip request. Declining or rejecting a trip request of a passenger determined to be likely an offender in an incident can increase driver safety. The driver 316 can proceed to and arrive at the pickup location, where the passenger 304 can enter the driver's vehicle 316*v* and be transported, by the driver 316 using the vehicle 316*v*, to the drop off location of the trip request or order. The passenger 304 can pay (e.g., with cash or via the ridesharing platform system 312) the driver 316 after arrival at the drop off location.

Using the passenger device 304*d*, the passenger 304 can interact with the ridesharing platform system 312 and request ridesharing services. For example, the passenger 340, using the passenger device 304*d*, can make a trip request to the ridesharing platform system 312. A trip request can include rider identification information, the number of passengers for the trip, a requested type of the provider (e.g., a vehicle type or service option identifier), the pickup location (e.g., a user-specified location, or a current location of the passenger device 304*d* as determined using, for example, a global positioning system (GPS) receiver), and/or the destination for the trip.

The passenger device 304*d* can interact with the ridesharing platform system 312 through a client application configured to interact with the ridesharing platform system 312. The client application can present information, using a user interface, received from the ridesharing platform system 312 and transmit information to the ridesharing platform system 312. The information presented on the user interface can include driver-related information, such as driver identity, driver vehicle information, driver vehicle location, and driver estimated arrival. The information presented on the user interface can include the drop off location, a route from the pickup location to the drop off location, an estimated trip duration, an estimated trip cost, and current traffic condition. The passenger device 304*d* can include a location sensor, such as a global positioning system (GPS) receiver, that can determine the current location of the passenger device 304*d*. The user interface presented by the client application can include the current location of the passenger device 304. The information transmitted can include a trip request, a pickup location, and a drop off location.

The ridesharing platform system 312 can allow the passenger 304 to specify parameters for the trip specified in the trip request, such as a vehicle type, a pick-up location, a trip destination, a target trip price, and/or a departure timeframe for the trip. The ridesharing platform system 312 can determine whether to accept or reject the trip request and, if so, assign or attempt to assign the driver 316 with the driver vehicle 316*v* and the driver device 316*d* to the passenger 304 and the passenger's trip request. For example, the ridesharing platform system 312 can receive a trip request from the passenger device 304*d*, select a driver from a pool of available drivers to provide the trip, and transmit an assignment request to the selected driver's device 316*d*.

The driver 316 can interact with, via the driver device 316*d*, the ridesharing platform system 312 to receive an assignment request to fulfill the trip request. The driver can decide to start receiving assignment requests by going online (e.g., launching a driver application and/or providing input on the driver application to indicate that the driver is receiving assignments), and stop receiving assignment requests by going offline. The driver 316 can receive, from the ridesharing platform system 312, an assignment request to fulfill a trip request made by the passenger using the passenger device 304*d* to the ridesharing platform system 312. The driver 316 can, using the driver device 316*d*, accepting or reject the assignment request. By accepting the assignment request, the driver 316 and the driver's vehicle 316*v* is assigned to the particular trip of the passenger 304, and is provided the passenger's pickup location and trip destination.

The driver device 316*d* can interact with the ridesharing platform system 312 through a client application configured to interact with the ridesharing platform system 312. The client application can present information, using a user interface, received from the ridesharing platform system 312 (e.g., an assignment request, a pickup location, a drop off location, a route from the pickup location to the drop off location, an estimated trip duration, current traffic condition, and passenger-related information, such as passenger name and gender) and transmit information to the ridesharing platform system 312 (e.g., an acceptance of an assignment request). The driver device 316*d* can include a location sensor, such as a global positioning system (GPS) receiver, that can determine the current location of the driver device 316*d*. The user interface presented by the client application can include the current location of the driver device 316 and a route from the current location of the driver device 316 to the pickup location. After accepting the assignment, the driver 316, using the driver's vehicle 316*v*, can proceed to the pickup location of the trip request to pick up the passenger 304.

The passenger device 304*d* and the driver device 316*d* can communicate with the ridesharing platform system 312 via the network 308. The network 308 can include one or more local area and wide area networks employing wired and/or wireless communication technologies (e.g., 3G, 4G, and 5G), one or more communication protocols (e.g., transmission control protocol/Internet protocol (TCP/IP) and hypertext transport protocol (HTTP)), and one or more formats (e.g., hypertext markup language (HTML) and extensible markup language (XML).

The ridesharing platform system 312 can translate information received from the passenger device 304*d* and the driver 316*d* from one language (e.g., Portuguese) into another language (e.g., English). The ridesharing platform system 312 can translate information received using a machine translation model (e.g., a statistical machine translation model, or a neural machine translation model). The machine translation model can be trained using a filtered subcorpus of sentence pairs of a corpus of sentence pairs.

The corpus of sentence pairs can be filtered to generate the filtered subcorpus of sentence pairs using dual monolingual conditional cross-entropy filtering.

Computer System

Figure 4:
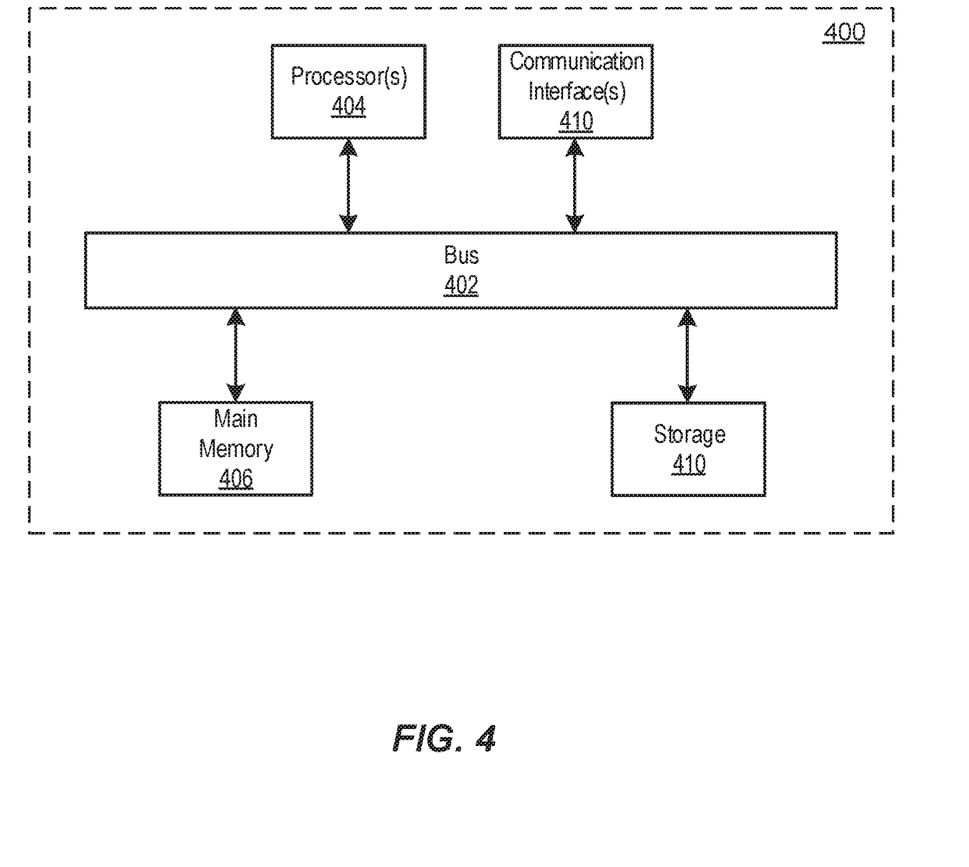
FIG. 4 is a block diagram of an example computer system in which any of the embodiments described herein may be implemented.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor(s) 404. Main memory 406 also may be used for storing temporary variables or other intermediate information during execution of instructions to be executed by processor(s) 404. Such instructions, when stored in storage media accessible to processor(s) 404, render computer system 400 into a special-purpose machine that is customized to perform the operations specified in the instructions. Main memory 406 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 408. Execution of the sequences of instructions contained in main memory 406 causes processor(s) 404 to perform the process steps described herein. For example, the process/method shown in FIG. 2 and described in connection with this figure may be implemented by computer program instructions stored in main memory 406. When these instructions are executed by processor(s) 404, they may perform the steps as shown in FIG. 2 and described above. In alternative embodiments, hard-wired circuitry may be used in place of or in combination with software instructions.

The computer system 400 also includes a communication interface 410 coupled to bus 402. Communication interface 410 provides a two-way data communication coupling to one or more network links that are connected to one or more networks. As another example, communication interface 410 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines.

In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

What is claimed is:

1. A system for filtering sentence pairs in two languages comprising:
   one or more processors; and
   a memory storing instructions that, when executed by the one or more processors, cause the system to perform:
   receiving a subset of sentence pairs of a plurality of sentence pairs,
      wherein a first half and a second half of each of the plurality of sentence pairs are associated with a first label of a first language and a second label of a second language, respectively, and
      wherein each of the subset of sentence pairs is selected using one or more feature scores determined using a first likelihood of the first half of the sentence pair according to a monolingual language model of the first language, and a second likelihood of the second half of the sentence pair, according to a monolingual language model of the second language,
      wherein the one or more feature scores comprise a dual monolingual conditional cross-entropy score for the sentence pair determined based on (1) a conditional entropy of the first half according to the monolingual language model of the first language, and (2) a conditional entropy of the second half according to the monolingual language model of the second language;

training a machine translation model using the subset of sentence pairs; and performing a machine translation task using the machine translation model.

2. The system of claim 1, wherein the memory stores instructions, that when executed by the one or more processors, cause the system to perform: selecting the subset of sentence pairs using the one or more feature scores for each of the sentence pair.

3. A system for filtering sentence pairs in two languages comprising:

one or more processors; and a memory storing instructions that, when executed by the one or more processors, cause the system to perform:

receiving a machine translation model trained using a subset of sentence pairs of a plurality of sentence pairs, wherein a first half and a second half of each of the plurality of sentence pairs are associated with a first label of a first language and a second label of a second language, respectively, and wherein each of the subset of sentence pairs is selected using one or more feature scores determined using a first likelihood of the first half of the sentence pair according to a monolingual language model of the first language, and a second likelihood of the second half of the sentence pair, according to a monolingual language model of the second language, wherein the one or more feature scores comprise a dual monolingual conditional cross-entropy score for the sentence pair determined based on (1) a conditional entropy of the first half according to the monolingual language model of the first language, and (2) a conditional entropy of the second half according to the monolingual language model of the second language; and performing a machine translation task using the machine translation model.

4. The system of claim 3, wherein the memory stores instructions, that when executed by the one or more processors, cause the system to perform:

selecting the subset of sentence pairs using the one or more feature scores for each of the sentence pair; and training the machine translation model using the subset of sentence pairs.

5. The system of claim 3, wherein the memory stores instructions, that when executed by the one or more processors, cause the system to perform: training the machine translation model using the subset of sentence pairs of the plurality of sentence pairs.

6. The system of claim 3, wherein the one or more feature scores further comprise a length score, a language identification score, and a rank score.

7. A method of filtering sentence pairs in two languages comprising:

under control of a processor:

receiving a language processing model trained using a subset of sentence pairs of a plurality of sentence pairs, wherein a first half and a second half of each of the plurality of sentence pairs are associated with a first label of a first language and a second label of a second language, respectively, and wherein each of the subset of sentence pairs is selected using one or more feature scores determined using a monolingual language model of the first language and a monolingual language model of the second language, and wherein the one or more feature scores comprise a dual monolingual conditional cross-entropy score for the sentence pair determined based on (1) a conditional entropy of the first half according to the monolingual language model of the first language, and (2) a conditional entropy of the second half according to the monolingual language model of the second language; and performing a language processing task using the language processing model.

8. The method of claim 7, wherein the dual monolingual conditional cross-entropy score for each of the plurality of sentence pairs comprises the dual monolingual conditional cross-entropy exponentiated.

9. The method of claim 7, wherein the dual monolingual conditional cross-entropy of each of the plurality of sentence pairs are related to a first likelihood of the first half of the sentence pair with respect to the monolingual language model in the first language and a second likelihood of the second half of the sentence pair with respect to the first monolingual model in the second language.

10. The method of claim 7, wherein the dual monolingual conditional cross-entropy score for each of the plurality of sentence pairs is determined using a first perplexity of the first half of the sentence pair with respect to the monolingual language model of the first language and a second perplexity of the second half of the sentence pair with respect the monolingual language model of the second language.

11. The method of claim 7, wherein the dual monolingual conditional cross-entropy score for each of the plurality of sentence pairs comprises: determining a difference between a first likelihood of the first half of the sentence pair with respect to the monolingual language model of the first language and a second likelihood of the second half of the sentence pair with respect the monolingual language model of the second language.

12. The method of claim 7, wherein an amount of information comprised in the monolingual language model in the first language and an amount of information comprised in the monolingual language model in the second language are similar.

13. The method of claim 7, wherein the monolingual language model in the first language is trained using a plurality of first training sentences in the first language, wherein the monolingual language model in the second language is trained using a plurality of second training sentences in the second language, and wherein a number of different words comprised in all first training sentences of the plurality of first training sentences in the first language and a number of different words comprised in all second training sentences of the plurality of second training sentences in the second language are similar.

14. The method of claim 7, wherein the monolingual language model in the first language is trained using a plurality of first training sentences in the first language, wherein the monolingual language model in the second language is trained using a plurality of second training sentences in the second language, and wherein a perplexity of the monolingual language model in the first language with respect to a plurality of first test sentences in the first language and a perplexity of the monolingual language model in the second language with respect to a plurality of second test sentences in the second language and parallel to the plurality of first test sentences are similar.

15. The method of claim 7, wherein the one or more feature scores further comprise:
- a length score determined using a ratio of a first length of the first half of the sentence pair and a second length of the second half of the sentence pair;
- a language identification score determined using a first confidence score and a second confidence score that words comprised in the first half and the second half of the sentence pair, respectively, are in the first language and the second language, respectively; and
- a rank score comprising a product of (i) a first monolingual rank score for the first half of the sentence pair determined using a first ranking of the first half of the sentence pair when selecting the sentence pair to train first language models that model representative first sentences in the first language and (ii) a second monolingual rank score for the second half of the sentence pair determined using a second ranking of the second half of the sentence pair when selecting the sentence pair to train second language models, corresponding to the first language models, that model representative second sentences in the second language.

16. The method of claim 15, wherein each of the subset of sentence pairs is selected using an overall score for the sentence pair comprising a product of all feature scores of the one or more feature scores.

17. The method of claim 15, wherein each of the subset of sentence pairs is selected using the one or more feature scores and a first predetermined threshold of a number of different words comprised in the first halves of all sentence pairs of the subset of sentence pairs.

18. The method of claim 17, wherein the first predetermined threshold comprises a number of different words in the first language comprised in the first halves of all sentence pairs of the subset of sentence pairs.

19. The method of claim 15, wherein each of the subset of sentence pairs is selected using the one or more feature scores and a first predetermined threshold of a number of different words comprised in the first halves of all sentence pairs of the subset of sentence pairs, and a second predetermined threshold of a number of different words comprised in the second halves of all sentence pairs of the subset of sentence pairs.

\* \* \* \* \*